United States Patent
Choi et al.

(10) Patent No.: US 8,027,307 B2
(45) Date of Patent: Sep. 27, 2011

(54) APPARATUS AND METHOD FOR MANAGING DELAY FOR TCP/IP COMMUNICATIONS IN A MOBILE COMMUNICATION SYSTEM

(75) Inventors: Ki-Bong Choi, Suwon-si (KR); Jong-Hyune Kim, Yongin-si (KR); In-Dong Yeo, Seoul (KR)

(73) Assignee: Samsung Electronics Co., Ltd (KR)

( * ) Notice: Subject to any disclaimer, the term of this patent is extended or adjusted under 35 U.S.C. 154(b) by 1100 days.

(21) Appl. No.: 11/702,431

(22) Filed: Feb. 5, 2007

(65) Prior Publication Data
US 2007/0202878 A1 Aug. 30, 2007

(30) Foreign Application Priority Data
Feb. 3, 2006 (KR) .................. 10-2006-0010381

(51) Int. Cl.
*H04W 4/00* (2009.01)
(52) U.S. Cl. .................. 370/331; 370/235; 455/436
(58) Field of Classification Search .................. 370/350, 370/352, 235, 331–333, 338; 375/346; 707/104.1; 713/201; 709/223; 455/436–444, 432.1, 455/428
See application file for complete search history.

(56) References Cited

U.S. PATENT DOCUMENTS

| | | | |
|---|---|---|---|
| 6,654,611 B2 | 11/2003 | Tiedemann, Jr. | |
| 6,681,232 B1* | 1/2004 | Sistanizadeh et al. | 707/104.1 |
| 2003/0016770 A1* | 1/2003 | Trans et al. | 375/346 |
| 2003/0026248 A1* | 2/2003 | Hiroki | 370/352 |
| 2003/0086515 A1* | 5/2003 | Trans et al. | 375/346 |
| 2003/0123428 A1* | 7/2003 | Lakaniemi et al. | 370/350 |
| 2004/0068668 A1* | 4/2004 | Lor et al. | 713/201 |
| 2005/0053002 A1* | 3/2005 | Chan et al. | 370/235 |
| 2005/0176473 A1* | 8/2005 | Melpignano | 455/574 |
| 2006/0209686 A1* | 9/2006 | Wigard et al. | 370/229 |

FOREIGN PATENT DOCUMENTS

| | | |
|---|---|---|
| KR | 1020050102022 | 10/2005 |
| KR | 1020060044417 | 5/2006 |
| KR | 1020060062943 | 6/2006 |

* cited by examiner

*Primary Examiner* — Kent Chang
*Assistant Examiner* — Magdi Elhag
(74) *Attorney, Agent, or Firm* — The Farrell Law Firm, P.C.

(57) ABSTRACT

An apparatus and method for managing a packet transmission delay for TCP/IP-based communications in a mobile communication system are provided, in which a BSC imposes no delay on a packet directed to an MS or a packet transmitted from the MS and sends the packet to the MS or corresponding MS, if it is determined that the MS starts to perform a handover during communications with the MS, and delays a packet directed to the MS or a packet transmitted from the MS and sends the delayed packet to the MS or corresponding MS, if it is determined that the MS has completed the handover during the packet transmission with no delay. Advantageously, timeout occurrences caused by too long a time delay are reduced, thereby preventing decreased throughput during the TCP/IP-based handover.

12 Claims, 3 Drawing Sheets

US 8,027,307 B2

APPARATUS AND METHOD FOR MANAGING DELAY FOR TCP/IP COMMUNICATIONS IN A MOBILE COMMUNICATION SYSTEM

PRIORITY

This application claims priority under 35 U.S.C. §119 to a Korean Patent Application filed in the Korean Intellectual Property Office on Feb. 3, 2006 and assigned Serial No. 2006-10381, the contents of which are incorporated herein by reference.

BACKGROUND OF THE INVENTION

1. Field of the Invention

The present invention relates generally to Transmission Control Protocol/Internet Protocol (TCP/IP)-based communications in a mobile communication system, and in particular, to an apparatus and method for increasing throughput by controlling time delay such that timeouts do not occur during TCP/IP-based communications.

2. Description of the Related Art

Since the start of their commercialization, mobile communication systems have witnessed a rapid growth and are now servicing a large number of users. Along with the development of mobile communication systems, Circuit Switching (CS) has gradually given place to Packet Switching (PS) and CS mobile communication systems now coexist with PS mobile communication systems according to their uses.

FIG. 1 illustrates the configuration of a conventional mobile communication system.

In FIG. 1, the mobile communication system includes a Core Network (CN) 140, Base Station Controllers (BSCs) 130, Base Transceiver Stations (BTSs) 120, and a Mobile Station (MS) 110.

In CS communications, the MS 110 communicates with the other party through a BTS 120, a BSC 130, and a Mobile Switching Center (MSC) of the CN 140.

Similarly, in PS communications, the MS 110 accesses the Internet through the BTS 120, a Packet Control Function (PCF) of the BSC 130, and a Packet Data Serving Node (PDSN) of the CN 140 and communicates with the other party.

The PDSN is a kind of a router for connecting the Internet to the mobile communication system. The PCF may reside inside or outside the BSC 130 depending on system implementation.

Generally, the PS communications are conducted in a connection-oriented or connectionless-oriented manner. The TCP/IP is connection-oriented and the User Datagram Protocol/Internet Protocol (UDP/IP) is connectionless-oriented.

In operation, when one end node sends a packet to a second end node in the TCP/IP, the second end node sends a response message in case of successful packet reception. This way, the communication connection status is checked during communications.

However, in case of a failed packet reception, due to packet loss or a long time delay, the second end node does not send a response message. Thus, a timeout occurs for the transmitted packet in the TCP/IP layer of the end node and the end node significantly reduces the amount of data to be sent at a time, considering that the network is congested. The decrease of the data amount leads to the decrease of throughput and performance degradation.

Typically, during handover of the MS 110 in the mobile communication system, a long time delay often occurs in a packet transmission, resulting in frequent timeouts.

Conventionally, an intermediate node (usually, a BSC) imposes a random delay on a received packet and then forwards the packet to the other party. The constant delay lengthens the timeout duration and, thus, prevents the decrease of throughput.

However, a time delay imposed during handover adds to a total time delay too long to be tolerated in the TCP/IP because the handover involves a time delay in itself. Consequently, the decrease of throughput is not prevented, and, conversely, the number of timeout occurrences is increased.

SUMMARY OF THE INVENTION

An object of the present invention is to substantially solve at least the above problems and/or disadvantages and to provide at least the advantages below. Accordingly, an object of the present invention is to provide an apparatus and method for preventing delay from being imposed on a transmission packet during handover involving TCP/IP-based communications in a mobile communication system.

According to one aspect of the present invention, there is provided a method of a BSC for managing packet transmission delay for TCP/IP-based communications in a mobile communication system, in which the BSC imposes no delay on a packet directed to an MS or a packet transmitted from the MS and sends the packet to the MS or corresponding MS, if it is determined that the MS starts to perform a handover during communications with the MS, and delays a packet directed to the MS or a packet transmitted from the MS and sends the delayed packet to the MS or corresponding MS, if it is determined that the MS has completed the handover during the packet transmission with no delay.

According to another aspect of the present invention, there is provided an apparatus of a BSC for managing packet transmission delay for TCP/IP-based communications in a mobile communication system. The apparatus includes a communication module communicates with other nodes, and a controller imposes no delay on a packet directed to an MS or a packet transmitted from the MS and sends the packet to the MS or corresponding MS through the communication module, when the MS starts a handover, and delays a packet directed to the MS or a packet transmitted from the MS and sends the delayed packet to the MS or corresponding MS through the communication module, when the MS has completed the handover during the packet transmission with no delay.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
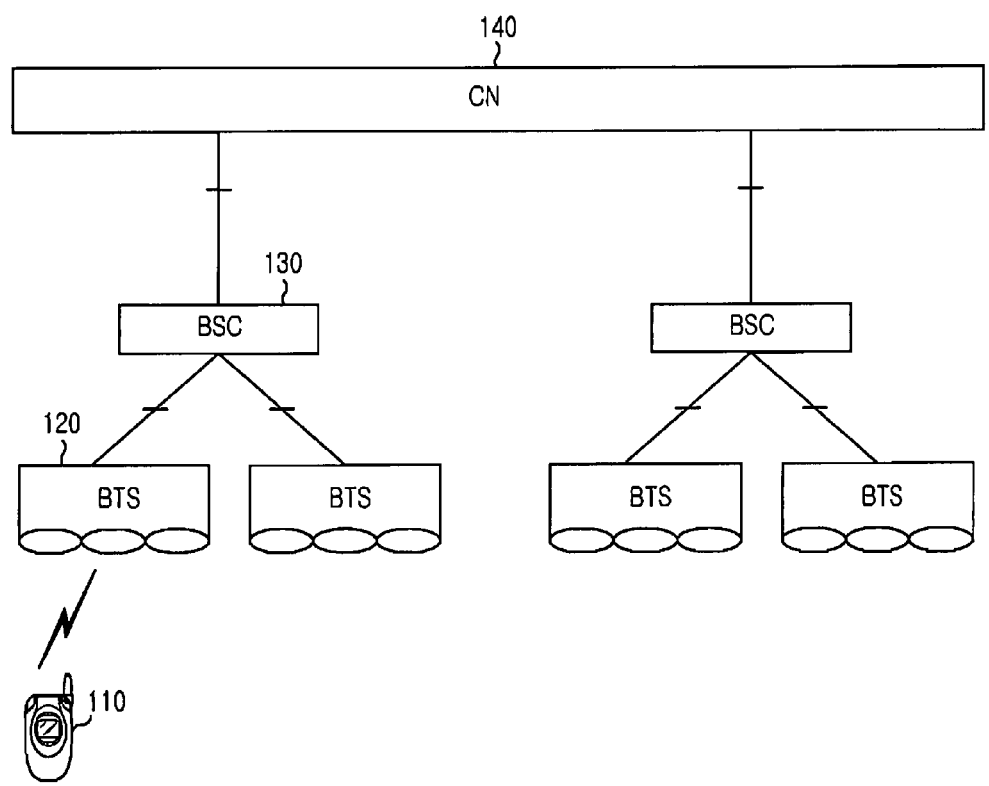
FIG. 1 is a schematic diagram illustrating the configuration of a conventional mobile communication system.
Figure 2:
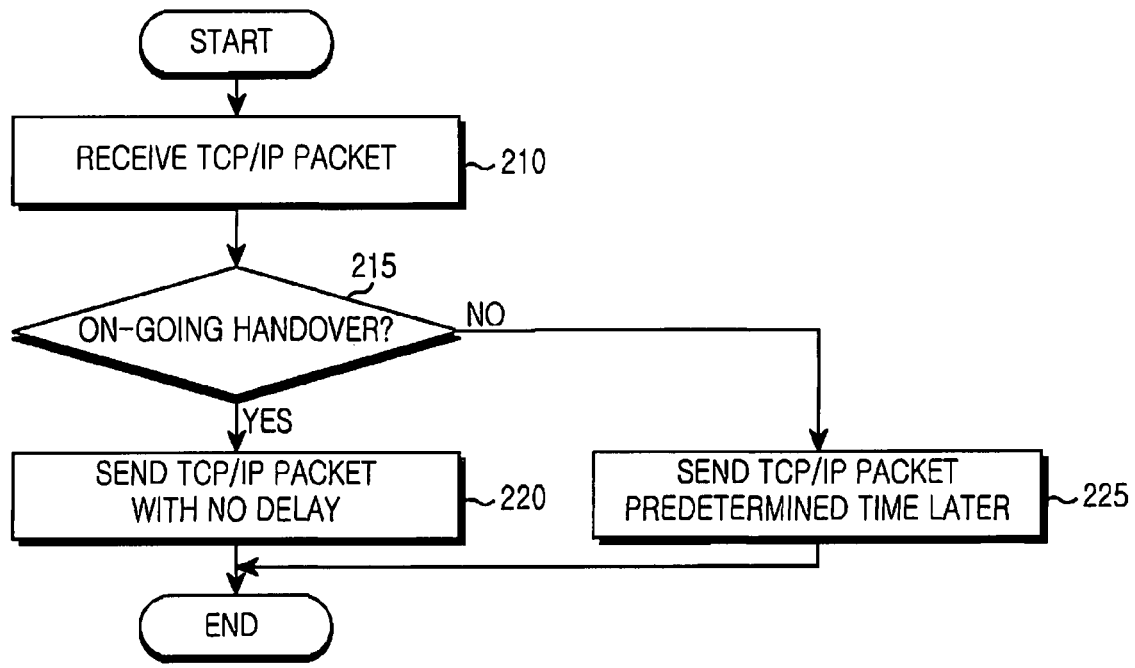
FIG. 2 is a flow diagram illustrating an operation for determining a delay for a TCP packet in a BSC according to the present invention.

FIG. 2 is a flow diagram illustrating an operation for determining a delay for a TCP packet in a BSC according to the present invention. In operation, the BSC does not impose a delay on a transmission packet during handover, thereby preventing throughput from being decreased by an increased time delay and, thus, preventing overall performance degradation.

In FIG. 2, upon receipt of a TCP/IP packet in step 210, the BSC determines whether a handover is in progress for an MS in step 215. If the handover is on-going, with no delay, the BSC sends the TCP/IP packet received from a receiving terminal immediately to the MS or sends the TCP/IP packet received from the MS to the receiving terminal in step 220. If the MS is not in the handover status, the BSC delays the TCP/IP packet and then sends it to the MS of the receiving terminal in step 225. Then, the BSC ends the process of the present invention.

Figure 3:
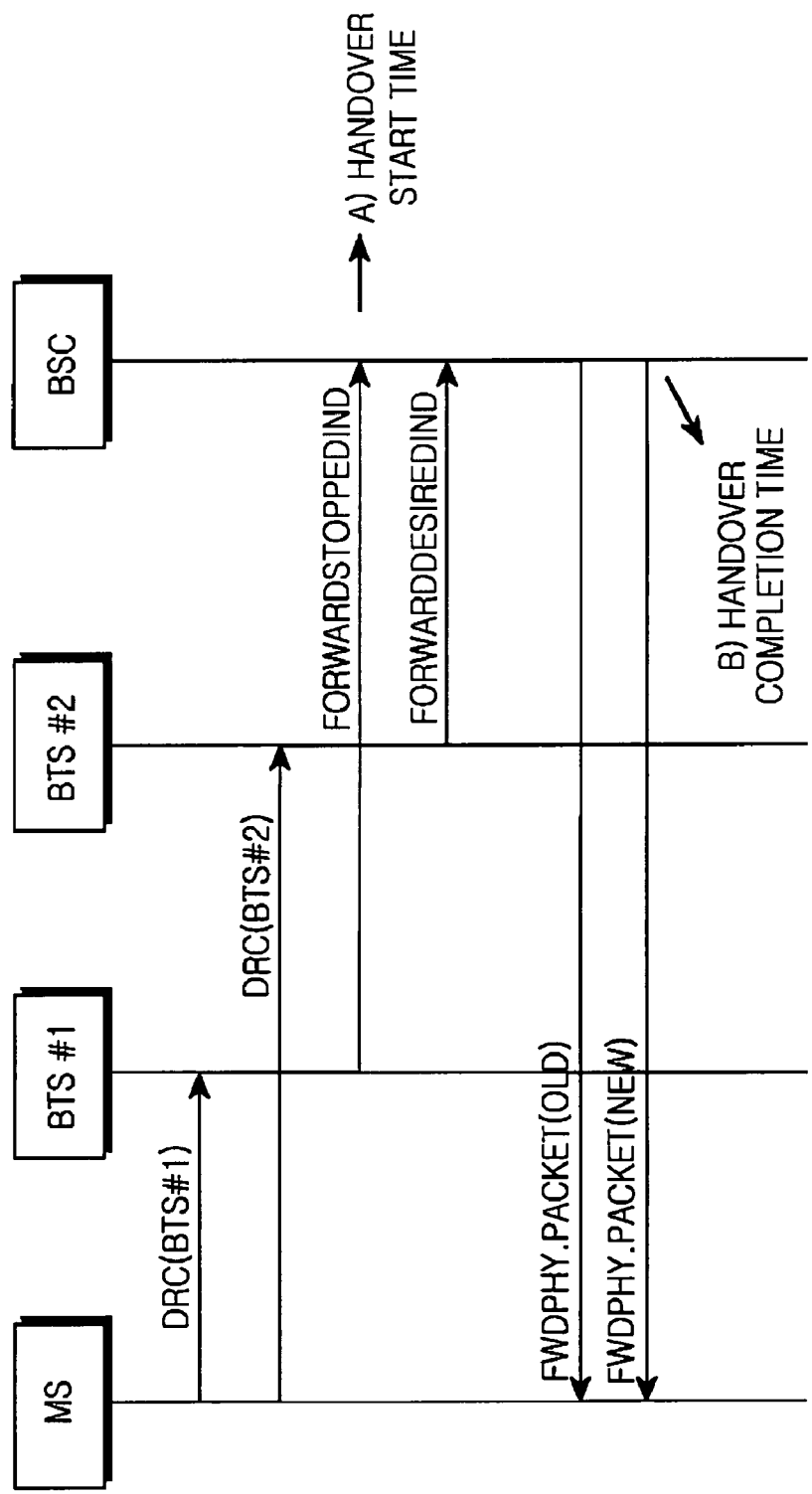
FIG. 3 is a flow diagram illustrating a signal flow for determining the handover status of an MS in the BSC according to the present invention.

In FIG. 3, a method for determining whether the MS is performing handover is illustrated, and shows a time instant when the BSC makes a decision as to the handover status of the MS according to the present invention.

Here, at time A), the BSC determines that the MS starts a handover. Specifically, the MS measures the signal strengths of the neighbor BSs and decides on a handover to a new BTS, BTS #2. The MS then notifies a serving BS, i.e. old BTS, BTS #1 and the new BTS, BTS #2 of the upcoming handover by a Data Rate Control (DRC) message.

BTS #1 and BTS #2 request the handover by sending a ForwardStoppedInd message to the BSC. The BSC determines that the time of receiving the ForwardStoppedInd message is the time of starting the handover in the MS.

At time B), the BSC determines that the MS has completed the handover. In particular, the MS moves to the service area of BTS #2 by the handover. After the handover, the MS receives from BTS #2 an old packet FwdPhy.Packet(Old) which was sent by BTS #1 but was not received due to the handover, and also receives a new packet FwdPhy.Packet (New) sent by BTS #2. The BSC determines a time when the BSC sends a packet for the MS to BTS #2 to be a time when the MS has completed the handover.

When the MS is placed between time A) and time B), the BSC determines that the MS is performing the handover.

As described above, during a TCP/IP-based handover of an MS in a mobile communication system, a BSC advantageously imposes no delay in transmission of the TCP/IP packets. Therefore, timeout occurrences caused by too long a time delay are reduced and, thus, decreasing throughput is prevented during the TCP/IP-based handover.

While the invention has been shown and described with reference to certain preferred embodiments thereof, it will be understood by those skilled in the art that various changes in form and details may be made therein without departing from the spirit and scope of the invention as, defined by the appended claims.

What is claimed is:

1. A system for managing a packet transmission delay for Transmission Control Protocol/Internet Protocol (TCP/IP)-based communications in a mobile communication system, comprising:
    a Base Station Controller (BSC) for imposing no random delay on a packet directed to a Mobile Station (MS) or a packet transmitted from the MS, if the MS is performing a handover, and imposing a random delay on a packet directed to the MS or a packet transmitted from the MS, if the MS is not performing the handover, under the TCP/IP-based communications;
    the MS for measuring signal strengths of Base Transceiver Stations (BTSs) and requesting the handover, under the TCP/IP-based communications;
    an old BTS serving the MS, for receiving the handover request from the MS and requesting the handover for the MS to the BSC, under the TCP/IP-based communications; and
    a new BTS to which the MS performs the handover, under the TCP/IP-based communications.

2. The system of claim 1, wherein the BSC determines a time when the BSC receives the handover request from the old BTS to be a time when the MS starts the handover.

3. The system of claim 1, wherein the BSC determines a time when the BSC sends a packet to the new BTS after the handover to be a time when the MS has completed the handover.

4. A method for managing a packet transmission delay for Transmission Control Protocol/Internet Protocol (TCP/IP)-based communications in a mobile communication system, comprising:
    delaying, according to a random delay, a packet directed to a Mobile Station (MS) or a packet transmitted from the MS and sending the delayed packet by a Base Station Controller (BSC), under the TCP/IP-based communications;
    imposing no random delay on a packet directed to the MS or a packet transmitted from the MS and sending the packet by the BSC, if the MS is performing a handover during the transmission, under the TCP/IP-based communications; and
    delaying, according to a random delay, a packet directed to the MS or a packet transmitted from the MS and sending the delayed packet by the BSC, if the MS has completed the handover, under the TCP/IP-based communications.

5. The method of claim 4, wherein the BSC determines a time when the BSC receives a handover request from an old Base Transceiver Station (BTS) communicating with the MS to be a time when the MS starts the handover.

6. The method of claim 4, wherein the BSC determines a time when the BSC sends a packet to a new BTS to which the MS performs the handover after the handover to be a time when the MS has completed the handover.

7. A method of a Base Station Controller (BSC) for managing a packet transmission delay for Transmission Control Protocol/Internet Protocol (TCP/IP)-based communications in a mobile communication system, comprising:
    imposing no random delay on a packet directed to a Mobile Station (MS) or a packet transmitted from the MS and sending the packet to the MS or corresponding MS, if it is determined that the MS starts to perform a handover during communications with the MS, under the TCP/IP-based communications; and
    delaying, according to a random delay, a packet directed to the MS or a packet transmitted from the MS and sending the delayed packet to the MS or corresponding MS, if it is determined that the MS has completed the handover during the packet transmission with no delay, under the TCP/IP-based communications.

8. The method of claim 7, wherein a time when the BSC receives a handover request from an old Base Transceiver Station (BTS) communicating with the MS is determined to be a time when the MS starts the handover.

9. The method of claim 7, wherein a time when the BSC sends a packet to a new BTS to which the MS performs the handover after the handover is determined to be a time when the MS has completed the handover.

10. An apparatus of a Base Station Controller (BSC) for managing a packet transmission delay for Transmission Control Protocol/Internet Protocol (TCP/IP)-based communications in a mobile communication system, comprising:
- a communication module for communicating with other nodes, under the TCP/IP-based communications; and
- a controller for imposing no random delay on a packet directed to a Mobile Station (MS) or a packet transmitted from the MS and sending the packet to the MS or corresponding MS through the communication module, when the MS starts a handover, and delaying, according to a random delay, a packet directed to the MS or a packet transmitted from the MS and sending the delayed packet to the MS or corresponding MS through the communication module, when the MS has completed the handover during the packet transmission with no delay, under the TCP/IP-based communications.

11. The apparatus of claim 10, wherein the controller determines a time when the BSC receives a handover request from an old Base Transceiver Station (BTS) communicating with the MS to be a time when the MS starts the handover.

12. The apparatus of claim 10, wherein the controller determines a time when the BSC sends a packet to a new BTS after the handover to which the MS performs the handover to be a time when the MS has completed the handover.

* * * * *